(12) United States Patent
Ma et al.

(10) Patent No.: US 7,941,007 B1
(45) Date of Patent: *May 10, 2011

(54) LOW LEVEL VIDEO DETAIL TRACKING BY INTUITIONISTIC FUZZY RELATIONSHIP CALCULUS

(75) Inventors: Yue Ma, San Jose, CA (US); Hongmin Zhang, Santa Clara, CA (US)

(73) Assignee: Pixelworks, Inc., Portland, OR (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/362,171

(22) Filed: Jan. 29, 2009

Related U.S. Application Data (63) Continuation of application No. 11/531,770, filed on Sep. 14, 2006, now Pat. No. 7,502,529, which is a continuation-in-part of application No. 11/216,436, filed on Aug. 30, 2005, now Pat. No. 7,292,738, which is a continuation of application No. 09/925,195, filed on Aug. 9, 2001, now Pat. No. 6,965,705.

(60) Provisional application No. 60/725,897, filed on Oct. 11, 2005.

(51) Int. Cl.
*G06K 9/32* (2006.01)

(52) U.S. Cl. .................. 382/300; 382/266; 382/273

(58) Field of Classification Search .................. 382/300, 382/266–269, 273
See application file for complete search history.

(56) References Cited

U.S. PATENT DOCUMENTS

| | | | |
|---|---|---|---|
| 5,296,690 A | 3/1994 | Chandler et al. | |
| 5,424,780 A | 6/1995 | Cooper | |
| 5,513,281 A | 4/1996 | Yamashita et al. | |
| 5,602,654 A | 2/1997 | Patti et al. | |
| 5,832,143 A * | 11/1998 | Suga et al. | 382/300 |
| 6,262,773 B1 | 7/2001 | Westerman | |
| 6,529,637 B1 | 3/2003 | Cooper | |
| 7,280,709 B2 * | 10/2007 | Minami et al. | 382/300 |
| 7,502,529 B1 * | 3/2009 | Ma et al. | 382/300 |

* cited by examiner

*Primary Examiner* — Wesley Tucker
(74) *Attorney, Agent, or Firm* — Marger Johnson & McCollom PC (57) ABSTRACT

To interpolate a value for a pixel, multiple patterns are selected. Each pattern is used to determine a pixel angle. One of the determined pixel angles is then selected based on the reliability of the pixel angles. The selected pixel angle can be selected based on its reliability irrespective of the reliability of other pixel angles. The selected pixel angle can then be used to interpolate a value for the target pixel. Dynamic thresholds can be computed for use in either determining a pixel angle for a given pattern, or to select the pixel angle from the available determined pixel angles.

33 Claims, 7 Drawing Sheets

LOW LEVEL VIDEO DETAIL TRACKING BY INTUITIONISTIC FUZZY RELATIONSHIP CALCULUS

RELATED APPLICATION DATA

This application is a continuation of U.S. patent application Ser. No. 11/531,770, titled "LOW LEVEL VIDEO DETAIL TRACKING BY INTUITIONISTIC FUZZY RELATIONSHIP CALCULUS", filed Sep. 14, 2006, now U.S. Pat. No. 7,502,529, issued Mar. 10, 2009, which is a continuation-in-part of U.S. patent application Ser. No. 11/216,436, titled "METHOD AND SYSTEM FOR DYNAMIC ANGLE INTERPOLATION IN IMAGE PROCESSING", filed Aug. 30, 2005, now U.S. Pat. Nos. 7,292,738, issued Nov. 6, 2007, which is a continuation of U.S. patent application Ser. No. 09/925,195, titled "METHOD AND SYSTEM FOR DYNAMIC ANGLE INTERPOLATION IN IMAGE PROCESSING", filed Aug. 9, 2001, now U.S. Pat. No. 6,965,705, issued Nov. 15, 2005, all by the same inventors and commonly assigned, both of which are hereby incorporated by reference. U.S. patent application Ser. No. 11/531,770 claims the benefit of U.S. Provisional Patent Application Ser. No. 60/725,897, filed Oct. 11, 2005, which is hereby incorporated by reference.

FIELD

This invention pertains to program execution, and more particularly to improving the efficiency in executing program instructions.

BACKGROUND

Figure 1A:
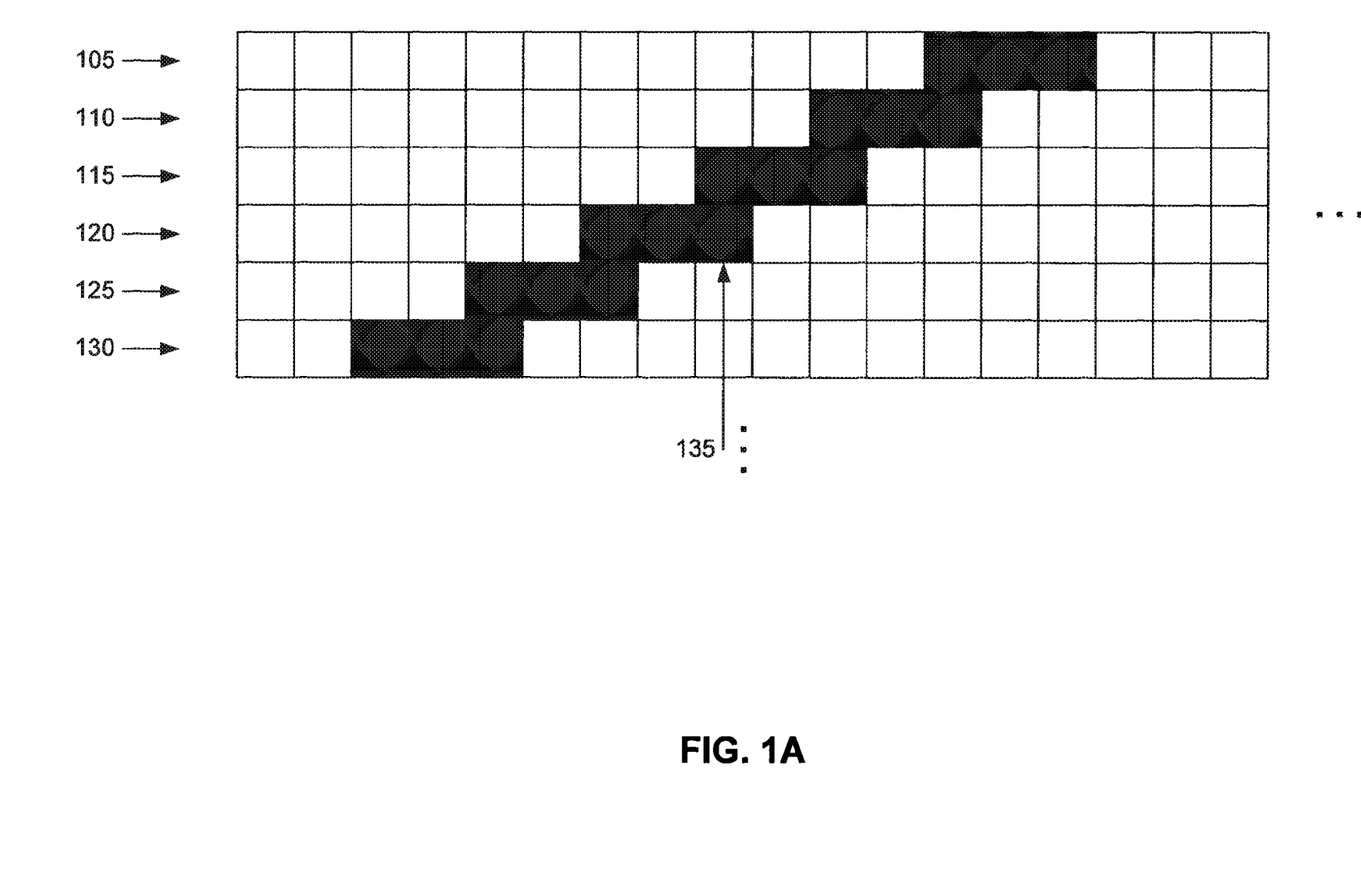
FIGS. 1A-1B show rows of an image, received by a display as either non-interlaced or interlaced data.

In displaying images on a display (be it a monitor, television, or some other machine that displays data), that data can be received in different ways. When the data is received non-interlaced, the data is sent pixel by pixel, row by row: every row is sent sequentially for every frame. For example, FIG. 1A shows rows 105, 110, 115, 120, 125, and 130 of an image: in FIG. 1A, the image includes a line. If the data are received non-interlaced, then the data in row 105 is received, followed by row 110, then row 115, and so on. When the entire image has been painted, the data re received again, starting with the first pixel in row 105. In particular, when the data is received as non-interlaced data, pixel 135 is received as part of the data for row 120 for the image every time the display is refreshed.

Figure 1B:
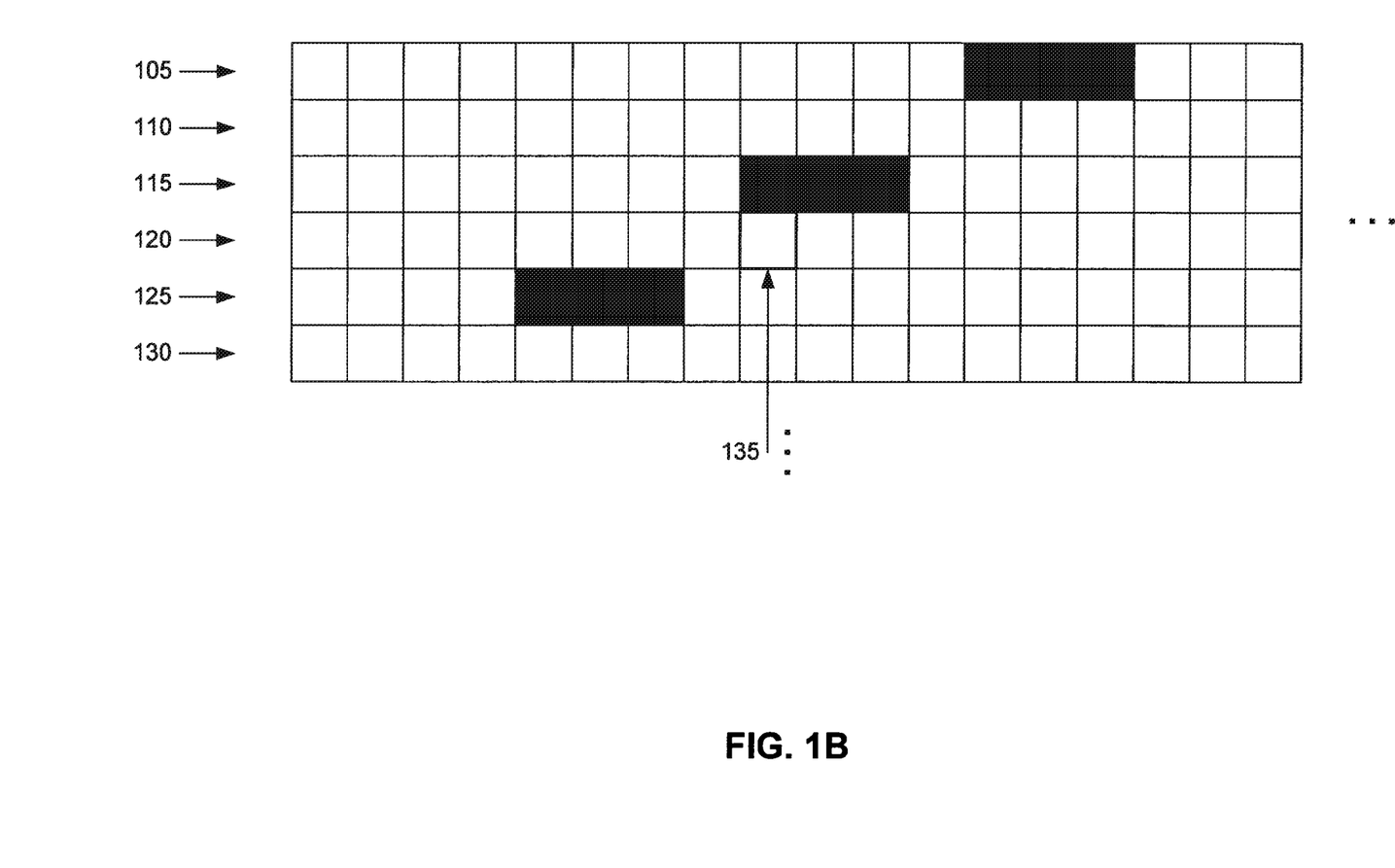

Sometimes, however, the data are received interlaced. When the data are received interlaced, the rows are received alternately. So row 105 is received first, then row 115, then row 125, and so on. After the first set of rows is received, the second set is received, starting with row 110, then row 120, then row 130, and so on. Once the second set of rows has been completely received, the process starts over with the first set of rows again. For example, FIG. 1B shows the half of the data that are received when the data are transmitted interlaced.

A problem with receiving interlaced data is that the data in the different sets of rows come from different frames. In other words, the data received in the second set of rows often are from a slightly different image than the data received in the first set of rows. If the image is static, this is not a real problem. But if the image is dynamic (that is, the frames are different, such as might be used to show motion), then the images might not appear smooth (given that different rows are updated at different times).

To address this problem, the display can attempt to fill the missing rows not provided in the interpolated data. That is, given rows 105 and 115, the display can attempt to determine values for the pixels in row 110, such as pixel 135. In this manner, the display can try to display frames that appear smooth.

But interpolating the values for the missing rows is not necessarily straightforward. Bear in mind that, in attempting to interpolate pixels in, say, row 120, the display only has the data in rows 105, 115, and 125. A simple approach to pixel value interpolation would involve interpolating based on the pixel directly above and directly below the pixel in question. But if one or both of the values of the pixels immediately above and below the pixel being interpolated are unrelated to the correct value for the pixel being interpolated, the interpolated value for pixel 135 might not be accurate. As shown in FIG. 1A, pixel 135 is part of the line that is three pixels wide, and is dark, as is the pixel immediately above pixel 135. But the pixel immediately below pixel 135, which is not part of this line, is light. Simple interpolation by averaging the values of the pixels above and below the pixel in question would produce an inaccurate value for pixel 135.

A need remains for a way to accurately interpolate a value for a pixel in interlaced data on a display, that addresses these and other problems associated with the prior art.

DETAILED DESCRIPTION

Figure 2:
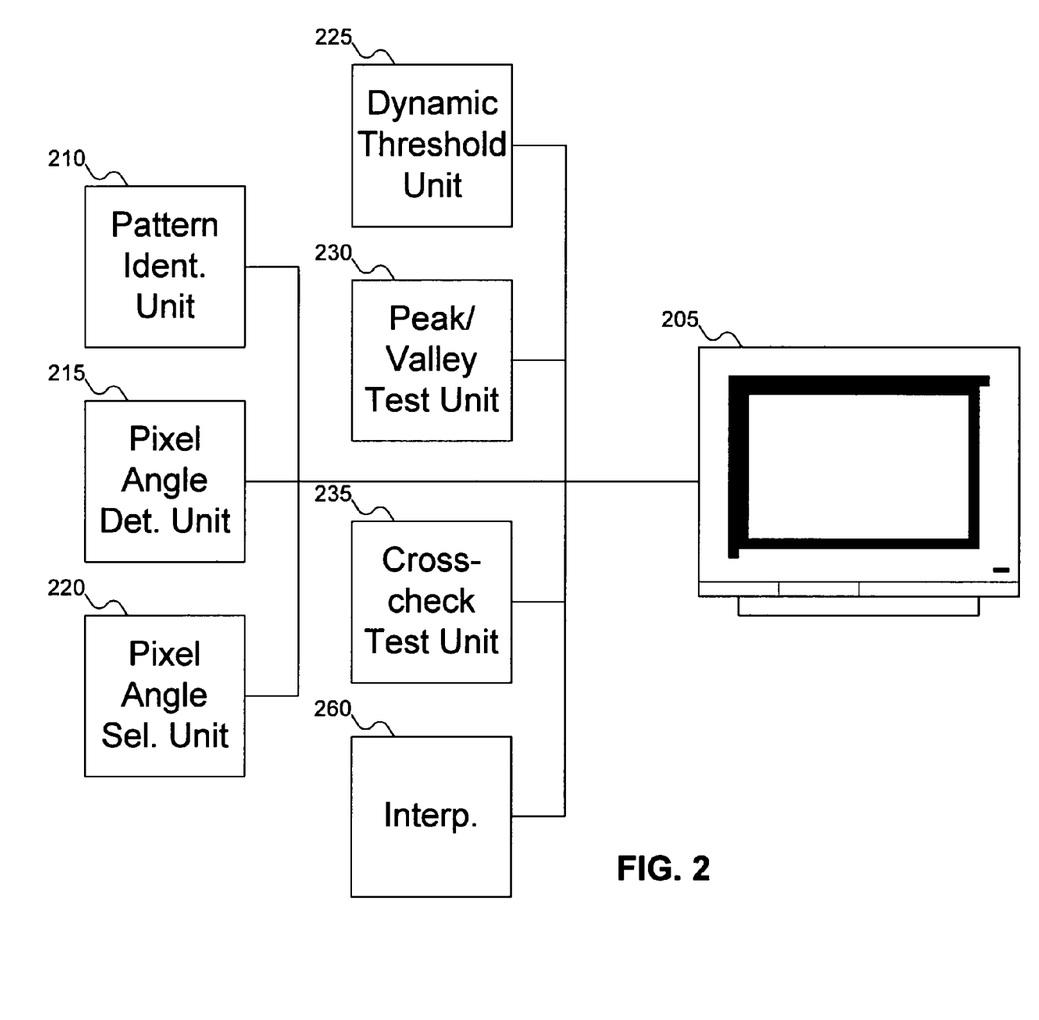
FIG. 2 shows a display operative to perform interpolation of a pixel value, according to an embodiment of the invention.

FIG. 2 shows a display operative to perform interpolation of a pixel value, according to an embodiment of the invention. In FIG. 2, display 205 is shown as a cathode ray tube (CRT) monitor, as might be connected to a computer. But a person skilled in the art will recognize that the embodiments of the invention are applicable to any display technology, including but not limited to LCD displays, plasma displays, and any other display technology. Further, a person skilled in the art will recognize that embodiments of the invention can be used with displays connected to computers, televisions, or any other form of displays.

Display 205 includes several units. Pattern identification unit 210 is used to identify patterns to use in determining the appropriate angle to use to interpolate the pixel value. Patterns can include any combination of pixels from the rows preceding and following the row in which the pixel is to be interpolated. These patterns are usually spaced along lines through the pixel to be interpolated. Patterns are discussed more with reference to FIGS. 3-6 below.

Pixel angle determination unit 215 is responsible for determining the angle that is most likely for a given pixel pattern. That is, given a particular pattern of pixels (for example, three pixels), pixel angle determination unit 215 selects the angle that is most likely the angle along which the interpolation should be used.

It should be noted that different patterns of pixels can indicate different pixel angles as appropriate. For example, a pattern of three pixels might indicate that the appropriate angle for interpolation is 0° (that is, using the pixels directly above and below the target pixel), but a pattern of 15 pixels might indicate that the appropriate angle for interpolation is 18°. Pixel angle selection unit 220 is responsible for determining selecting an angle to use for interpolating the target pixel. How pixel angle selection unit 220 operates is discussed further below with reference to FIGS. 3-6.

To support pixel angle selection unit 220, dynamic threshold unit 225 is responsible for setting thresholds to select or reject pixel angles. Instead of using a static threshold to select or reject pixel angles, dynamic threshold unit 225 supports dynamic thresholds. Dynamic thresholds increase the flexibility of pixel angle selection unit 220 in selecting or rejecting pixel angles, but tightening or loosening the requirements to select a pixel angle based on circumstances. Dynamic threshold unit 225 is discussed further below with reference to FIGS. 3-6.

For a given pattern, peak/valley test unit 230 and cross check test unit 235 are used to test the selected pixel angle for special conditions that, if met, would be reasons to reject the pixel angle. Peak/valley test unit 230 and cross check test unit 235 are discussed further below with reference to FIG. 6. While FIG. 2 shows only peak/valley test unit 230 and cross check test unit 235, a person skilled in the art will recognize that other test units can be included. Other such test units include units to test for other conditions described in U.S. patent application Ser. No. 09/925,195, titled "METHOD AND SYSTEM FOR DYNAMIC ANGLE INTERPOLATION IN IMAGE PROCESSING", filed Aug. 9, 2001, now U.S. Pat. No. 6,965,705, issued Nov. 15, 2005, which is incorporated by reference herein.

Finally, interpolator 235 is responsible for interpolating the value for the pixel based on the selected angle. That is, given a selected angle, interpolator 235 uses the values of the pixels in the previous and subsequent rows along that angle to interpolate the value for the target pixel.

Figure 3:
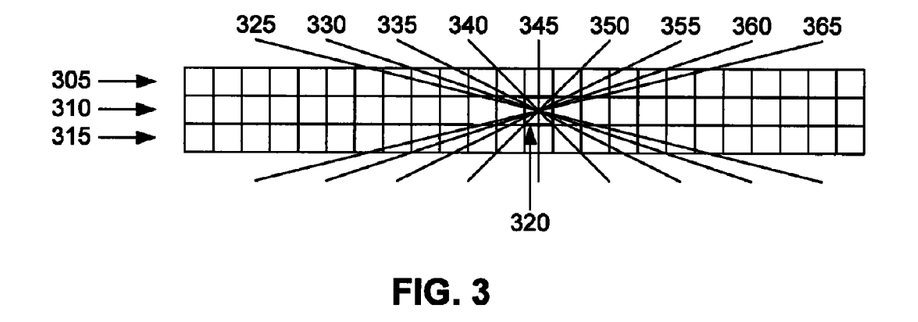
FIG. 3 shows nine different angles that can be used to interpolate a value for a pixel on the display of FIG. 2.

FIG. 3 shows nine different angles that can be used to interpolate a value for a pixel on the display of FIG. 2. In FIG. 3, three rows 305, 310, and 315 are shown. A person skilled in the art will recognize that there can be any number of rows; FIG. 3 (and FIGS. 4-5) shows three rows simply for explanatory purposes, and the comments made with reference to FIG. 3 apply to any rows in the image.

For pixel 320 (in row 310), nine angles are shown. These nine angles are identified as angles 325, 330, 335, 340, 345, 350, 355, 360, and 365, respectively. Relative to the vertical axis, these nine angles represent the following (approximate) degrees of rotation: −76°, −72°, −63°, −45°, 0°, 45°, 63°, 72°, and 76°. While FIG. 3 shows nine angles for interpolation of a target pixel, a person skilled in the art will recognize that there can be any number of angles considered. For example, 17 angles could be considered, at the cost of increased effort to select the best angle for interpolation. Experimentation has shown that using 17 angles produces better results than using nine angles, but the cost to implement an embodiment of the invention with 17 angles is not worth the better results.

Figure 4:
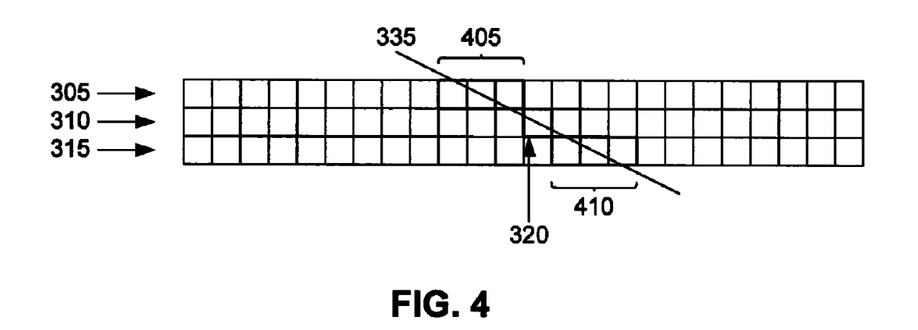
FIG. 4 shows a pattern of seven pixels being used to determine an angle for the pixel interpolation of FIG. 3.
Figure 5:
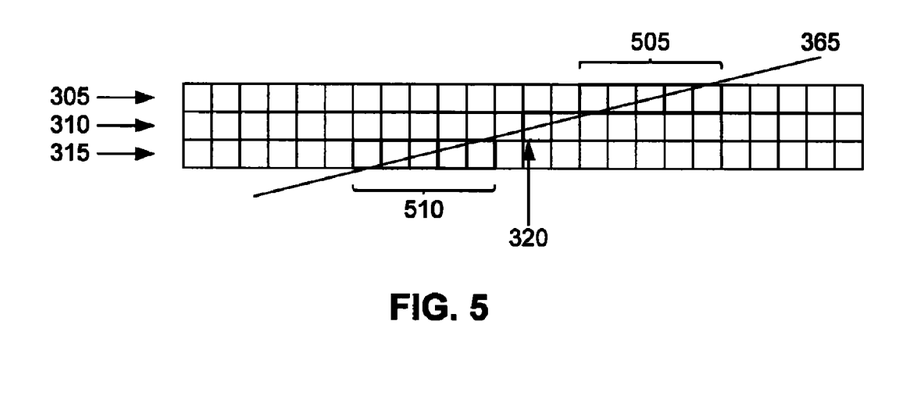
FIG. 5 shows a pattern of 11 pixels being used to determine an angle for the pixel interpolation of FIG. 3.

FIGS. 4-5 show different patterns being considered with different angles. In FIG. 4, the pattern consists of seven pixels: three from the row above the target pixel (pixels 405), three from the row below the target pixel (pixels 410), and the target pixel itself (pixel 320). In FIG. 4, the seven pixels are being used to consider the angle of −63°. Similarly, in FIG. 5, the pattern consists of 11 pixels (five from the row above the target pixel (pixels 505), five from the row below the target pixel (pixels 510), and the target pixel itself (pixel 320)); the angle under consideration is 76°.

As should be clear from reviewing FIGS. 4-5, a pattern consists of a set of pixels, some drawn from the row above the target pixel, some drawn from the row below the target pixel. The pattern can include any number of pixels in any arrangement, although typically the pattern includes the same number of pixels from each of the rows above and below the target pixel (in addition to the target pixel), with those pixels arranged symmetrically around one of the angles through the target pixel. In testing, it has proven useful to use patterns of three and 15 pixels; but a person skilled in the art will recognize that any number of pixels can be used in the patterns.

Different patterns are considered more likely to determine different pixel angles accurately. For example, a pattern of three pixels is considered more likely to accurately detect angles between −45° and 45°. On the other hand, a pattern of 15 pixels is considered more likely to detect lower angles, around −76° to 76°.

Figure 6:
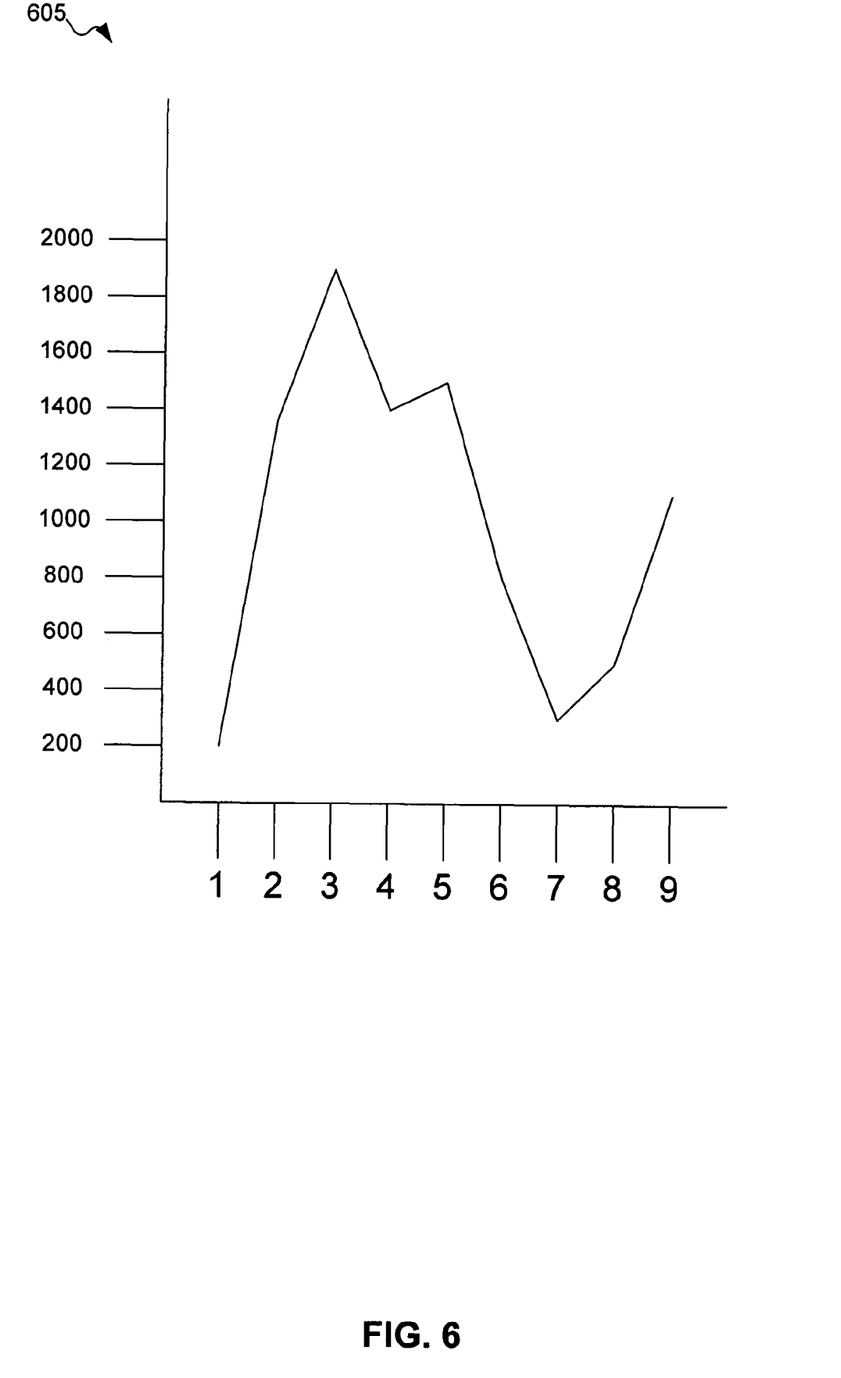
FIG. 6 shows a graph of valuations for a particular pattern used in computing a dynamic threshold in the display of FIG. 2.

FIG. 6 shows a graph of valuations for a particular pattern used in computing a dynamic threshold in the display of FIG. 2. In FIG. 6, the graph shows scores for different possible angles for a pixel, given a particular pattern. Thus, the x-axis represents the different angles, and the y-axis represents the scores for the pixels. The method for computing the scores for the different angles is described in related application U.S. patent application Ser. No. 09/925,195, titled "METHOD AND SYSTEM FOR DYNAMIC ANGLE INTERPOLATION IN IMAGE PROCESSING", filed Aug. 9, 2001, now U.S. Pat. No. 6,965,705, issued Nov. 15, 2005, which is incorporated by reference herein, and is not repeated here.

To select a dynamic threshold for the various tests (such as the cross-check test or the peak/valley test), any desired formula can be used. In one embodiment, the dynamic threshold is computed by first determining the maximum and minimum values for the curve. In FIG. 6, the maximum value is 1900, and the minimum value is 200. The minimum is then subtracted from the maximum value, and the result is divided by a factor: for example, the number of points on the curve. In FIG. 6, there are nine points on the curve, so the resulting dynamic threshold is (1900−200)/9=188.89. This value can then be used for the dynamic threshold.

The advantage of using a dynamic threshold is that it provides greater flexibility than a fixed threshold. With a fixed threshold, all analyses use the same (fixed) threshold. But by using a dynamic threshold, the threshold can be calculated as a larger or smaller value, as needed. For example, the swing between the maximum and minimum values in FIG. 6 is very large, so a larger threshold allows the display to ignore (relatively) larger variances without hindering the functionality of the embodiments of the invention. An example of such a variance that could be ignored is the change between angles 4 and 5. If a (small) fixed threshold (say, 50) would be used, this change in direction would be counted, even though it the change is relatively small. But with a dynamic threshold, the change between angles 4 and 5 can be considered small enough that it can be ignored. The dynamic threshold can be used with, for example, the peak/valley test unit or the cross-check unit, or anywhere a threshold is threshold is used in U.S. patent application Ser. No. 09/925,195, titled "METHOD AND SYSTEM FOR DYNAMIC ANGLE INTERPOLATION IN IMAGE PROCESSING", filed Aug. 9, 2001, now U.S. Pat. No. 6,965,705, issued Nov. 15, 2005, which is incorporated by reference herein. A person skilled in the art will also recognize that while the above describes calculating only one dynamic threshold, any number of dynamic thresholds can be computed, using different formulas or variables (for example, using a different factor), depending on the intended use.

Figure 7:
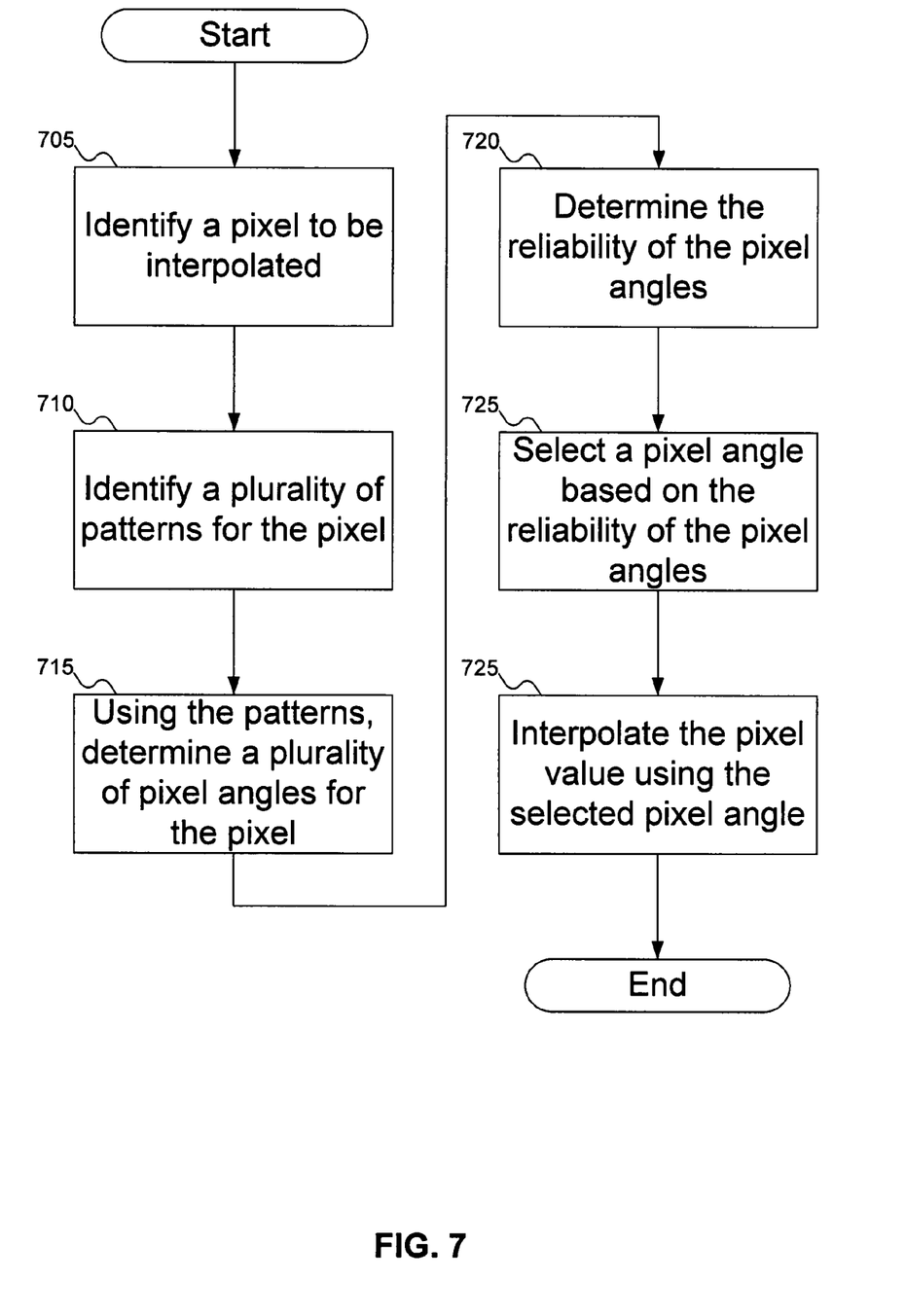
FIG. 7 shows a flowchart of the procedure used by the display of FIG. 2 to perform pixel interpolation.

FIG. 7 shows a flowchart of the procedure used by the display of FIG. 2 to perform pixel interpolation. In FIG. 7, at step 705, a pixel to be interpolated is identified. At step 710, a plurality of patterns are identified. As discussed above, any number of patterns can be selected, and any patterns can be chosen, but in one embodiment, the selected patterns include three and 15 pixels. At step 715, a plurality of pixel angles are determined using the plurality of patterns. As discussed above, each pattern is used to independently determine the pixel angle that seems most appropriate for the pattern. At step 720, the reliability of each of the plurality of pixel angles is determined. As discussed above with reference to FIGS. 4-5, different patterns are more likely to correctly detect different angles: for example, a pattern of three pixels is more likely to accurately angles near the vertical than near the horizontal (known as a "low angle"), whereas a pattern of 15 pixels is more likely to accurately detect low angles. At step 725, a pixel angle is selected from the plurality of determined pixel angles, based on the reliability of the pixel angles. Finally, at step 730, a value for the target pixel is interpolated based on the selected pixel angle.

While it is possible to select the pixel angle for the target pixel based solely on a reliability analysis (whichever pixel angle is considered more reliable is selected), there are other ways in which select the pixel angle. As an example of how the pixel angle can be selected in step 725, consider the use of two patterns: three pixels and 15 pixels. If the three pixel pattern indicates an angle of −45° to 45°, where the pattern is most likely to be accurate, the pixel angle determined by the three pixel pattern can be selected. Note that this selection can occur even without consideration as to the pixel angle determined by the 15 pixel pattern. (But if the angle really is around the vertical, then one would hope the 15 pixel pattern would also indicate that result, even if the result is less accurate.)

On the other hand, if the three pixel pattern indicates the pixel angle is a low angle, the result is not likely to be accurate, as the three pixel pattern does not accurately detect low angles. In that case, the display can use the pixel angle determined by the 15 pixel pattern. In this situation, is entirely possible that the two patterns would determine different pixel angles, but given that the pixel angle determined by the three pixel pattern is unlikely to be reliable, this discrepancy is less of an issue.

Figure 8:
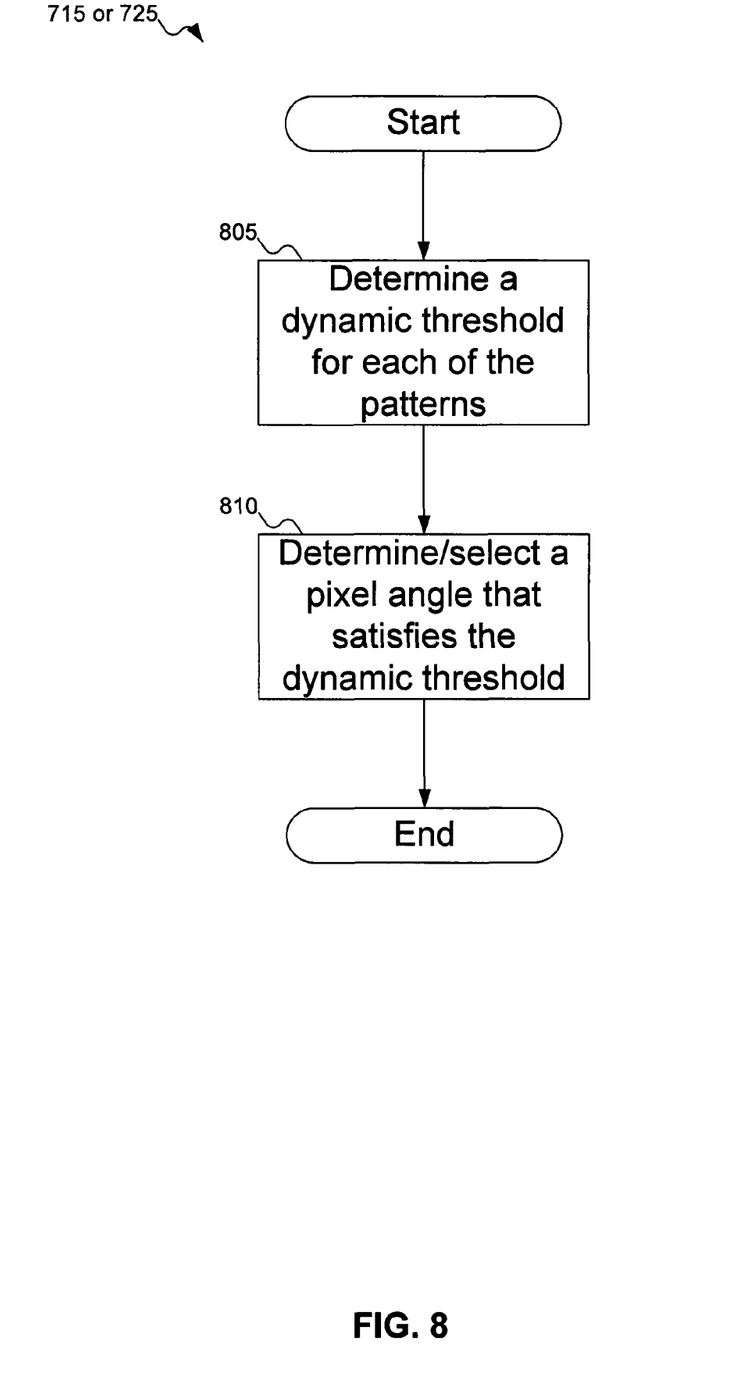
FIG. 8 shows a flowchart of a produce used by the display of FIG. 2 to select an angle to perform pixel interpolation.

FIG. 8 shows a flowchart of a second produce used by the display of FIG. 2 to select an angle to perform pixel interpolation. As discussed above with reference to FIG. 2, the display can include units to test for conditions, such as peak/valley conditions and cross checks, which can depend on a threshold. One way to determine the pixel angle for a particular pattern, or to select the pixel angle to use in interpolating the value for the target pixel, can use these tests. In that case, an embodiment of the invention can use a dynamic threshold.

At step 805, the display computes a dynamic threshold for each pattern. If the display is determining the pixel angle for single pattern, then obviously there is only one pattern being used, and the dynamic threshold is being computed for only one pattern. (As mentioned above, there can be multiple dynamic thresholds for the same pattern, if appropriate.) But if there are multiple patterns being considered, then one (or more) different dynamic threshold(s) can be computed for each pattern. Once the dynamic threshold(s) is/are computed, then at step 810 the display can use the dynamic threshold(s) as appropriate.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Such embodiments may also be referred to as program products. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may also be used in conjunction with communications media such antennas, wires, optical fibers, microwaves, radio waves, and other electromagnetic or optical carriers. Associated data may be delivered over transmission environments, including physical and/or logical networks, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "illustrated embodiment" or the like are used herein, these phrases are meant to generally reference embodiment possibilities, and are not intended to limit the invention to particular embodiment configurations. As used herein, these terms may reference the same or different embodiments that are combinable into other embodiments. Further, the various embodiments may be combined in any manner desired, to produce combinations not specifically discussed herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system for performing interpolation of a pixel in a frame, comprising:
    a display;
    a pattern identification unit in the display to identify a plurality of patterns for said pixel, each pattern in said plurality of patterns including a unique number of pixels in the frame and applicable to each of a plurality of pixel interpolation angles, so that each pattern in the plurality of patterns is used in considering each of the plurality of pixel interpolation angles;
    a pixel interpolation angle determination unit to determine a pixel interpolation angle for each of said plurality of patterns;
    a pixel interpolation angle selection unit to select one of said pixel interpolation angles for each of said plurality of patterns; and
    an interpolator to interpolate a value for said pixel using said selected pixel interpolation angle.

2. A system according to claim 1, wherein determining said plurality of patterns includes:
    a first pattern including three pixels; and
    a second pattern including 15 pixels.

3. A system according to claim 1, wherein each of the plurality of patterns includes only said pixel, pixels from a row immediately preceding said pixel, and pixels from a row immediately following said pixel.

4. A system according to claim 1, wherein the pixel interpolation angle selection unit is operative to select one of said pixel interpolation angles for each of said plurality of patterns based on a reliability of at least one of said plurality of pixel interpolation angles.

5. A system according to claim 4, wherein the pixel interpolation angle selection unit is operative to select a first pixel interpolation angle of said plurality of pixel interpolation angles if said first pixel interpolation angle is reliable.

6. A system according to claim 5, wherein the pixel interpolation angle selection unit is operative to select a second pixel interpolation angle of said plurality of pixel interpolation angles if said first pixel interpolation angle is not reliable.

7. A system according to claim 1, further comprising a dynamic threshold unit to determine a dynamic threshold for each of said plurality of patterns.

8. A system according to claim 7, wherein the dynamic threshold unit is operative to determine said dynamic threshold for each of said plurality of patterns by calculating a difference between a maximum value and a minimum value, scaled by a factor, for each of said plurality of patterns.

9. A system according to claim 7, further comprising a cross-check test unit to conduct a cross-check test for each of said plurality of pixel interpolation angles using said dynamic threshold for each of said plurality of patterns.

10. A method for performing interpolation of a pixel in a frame, comprising:
    using a processor, identifying a plurality of patterns for the pixel, each pattern in the plurality of patterns including a unique number of pixels in the frame and applicable to each of a plurality of pixel interpolation angles, so that each pattern in the plurality of patterns is used in considering each of the plurality of pixel interpolation angles;
    for each of the plurality of patterns, determining a pixel interpolation angle;
    selecting one of the determined pixel interpolation angles; and
    interpolating a value for the pixel using the selected pixel interpolation angle.

11. A method according to claim 10, wherein identifying a plurality of patterns for the pixel includes identifying the plurality of patterns for the pixel, each of the plurality of patterns including only said pixel, pixels from a row immediately preceding said pixel, and pixels from a row immediately following said pixel.

12. A method according to claim 10, wherein determining a plurality of angles includes:
    determining a first pixel interpolation angle using a first pattern; and
    determining a second pixel interpolation angle using a second pattern.

13. A method according to claim 12, wherein:
    determining a first pixel interpolation angle includes determining the first pixel interpolation angle using first pattern including three pixels; and
    determining a second pixel interpolation angle includes determining the second pixel interpolation angle using a second pattern including 15 pixels.

14. A method according to claim 13, wherein selecting one of the plurality of pixel interpolation angles includes selecting the first pixel interpolation angle if the first pixel interpolation angle is reliable.

15. A method according to claim 14, wherein selecting one of the plurality of pixel interpolation angles includes selecting the second pixel interpolation angle if the first pixel interpolation angle is not reliable.

16. A method according to claim 10, wherein selecting one of the plurality of pixel interpolation angles includes selecting one of the plurality of pixel interpolation angles based on a reliability of at least one of the plurality of pixel interpolation angles.

17. A method according to claim 16, wherein selecting one of the plurality of pixel interpolation angles based on a reliability of each of the plurality of pixel interpolation angles includes selecting a first pixel interpolation angle of the plurality of pixel interpolation angles if the first pixel interpolation angle reliable.

18. A method according to claim 17, wherein selecting one of the plurality of pixel interpolation angles based on a reliability of each of the plurality of pixel interpolation angles includes selecting a second pixel interpolation angle of the plurality of pixel interpolation angles if the first pixel interpolation angle is not reliable.

19. A method according to claim 10, wherein determining a plurality of pixel interpolation angles using the plurality of patterns includes:
    determining a plurality of dynamic thresholds for the plurality of patterns; and
    determining the plurality of pixel interpolation angles using the plurality of dynamic thresholds.

20. A method according to claim 19, wherein determining a plurality of dynamic thresholds includes:
- determining a maximum value for each pattern;
- determining a minimum value for each pattern;
- calculating the difference between the maximum values and the minimum values for each pattern; and
- scaling the differences by a factor for each pattern.

21. A method according to claim 19, wherein determining the plurality of pixel interpolation angles using the plurality of dynamic thresholds includes, for each pattern, determining a pixel interpolation angle that satisfies a cross-check test using the dynamic threshold.

22. An article comprising a processor-readable medium having associated data that, when accessed, results in a machine:
- identifying a plurality of patterns for a pixel in a frame, each pattern in the plurality of patterns including a unique number of pixels in the frame and applicable to each of a plurality of pixel interpolation angles, so that each pattern in the plurality of patterns is used in considering each of the plurality of pixel interpolation angles;
- for each of the plurality of patterns, determining a pixel interpolation angle;
- selecting one of the determined pixel interpolation angles; and
- interpolating a value for the pixel using the selected pixel interpolation angle.

23. An article according to claim 22, wherein identifying a plurality of patterns for the pixel includes identifying the plurality of patterns for the pixel, each of the plurality of patterns including only said pixel, pixels from a row immediately preceding said pixel, and pixels from a row immediately following said pixel.

24. An article according to claim 22, wherein determining a plurality of angles includes:
- determining a first pixel interpolation angle using a first pattern; and
- determining a second pixel interpolation angle using a second pattern.

25. An article according to claim 24, wherein:
- determining a first pixel interpolation angle includes determining the first pixel interpolation angle using first pattern including three pixels; and
- determining a second pixel interpolation angle includes determining the second pixel interpolation angle using a second pattern including 15 pixels.

26. An article according to claim 25, wherein selecting one of the plurality of pixel interpolation angles includes selecting the first pixel interpolation angle if the first pixel interpolation angle is reliable.

27. An article according to claim 26, wherein selecting one of the plurality of pixel interpolation angles includes selecting the second pixel interpolation angle if the first pixel interpolation angle is not reliable.

28. An article according to claim 22, wherein selecting one of the plurality of pixel interpolation angles includes selecting one of the plurality of pixel interpolation angles based on a reliability of at least one of the plurality of pixel interpolation angles.

29. An article according to claim 28, wherein selecting one of the plurality of pixel interpolation angles based on a reliability of each of the plurality of pixel interpolation angles includes selecting a first pixel interpolation angle of the plurality of pixel interpolation angles if the first pixel interpolation angle reliable.

30. An article according to claim 29, wherein selecting one of the plurality of pixel interpolation angles based on a reliability of each of the plurality of pixel interpolation angles includes selecting a second pixel interpolation angle of the plurality of pixel interpolation angles if the first pixel interpolation angle is not reliable.

31. An article according to claim 22, wherein determining a plurality of pixel interpolation angles using the plurality of patterns includes:
- determining a plurality of dynamic thresholds for the plurality of patterns; and
- determining the plurality of pixel interpolation angles using the plurality of dynamic thresholds.

32. An article according to claim 31, wherein determining a plurality of dynamic thresholds includes:
- determining a maximum value for each pattern;
- determining a minimum value for each pattern;
- calculating the difference between the maximum values and the minimum values for each pattern; and
- scaling the differences by a factor for each pattern.

33. An article according to claim 31, wherein determining the plurality of pixel interpolation angles using the plurality of dynamic thresholds includes, for each pattern, determining a pixel interpolation angle that satisfies a cross-check test using the dynamic threshold.

\* \* \* \* \*